United States Patent
Offenhaeuser et al.

(10) Patent No.: US 10,479,368 B2
(45) Date of Patent: Nov. 19, 2019

(54) METHOD AND DEVICE FOR OPERATING A DRIVER ASSISTANCE SYSTEM, AND DRIVER ASSISTANCE SYSTEM

(71) Applicant: Robert Bosch GmbH, Stuttgart (DE)

(72) Inventors: Andreas Offenhaeuser, Marbach am Neckar (DE); Erik Lesser, Steinheim (DE); Martin Kieren, Marbach A. N. (DE); Nils Hagenlocher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 15/803,019

(22) Filed: Nov. 3, 2017

(65) Prior Publication Data
US 2018/0126998 A1    May 10, 2018

(30) Foreign Application Priority Data
Nov. 9, 2016   (DE) .................... 10 2016 221 932

(51) Int. Cl.
*B60W 40/068*    (2012.01)
*B60W 30/08*    (2012.01)
(Continued)

(52) U.S. Cl.
CPC .......... *B60W 40/068* (2013.01); *B60W 30/02* (2013.01); *B60W 30/08* (2013.01);
(Continued)

(58) Field of Classification Search
CPC ............ G06K 9/00798; G06K 9/00791; B60T 8/1755; B60T 8/88; B60T 8/171; B60T 8/1725; B60T 8/172; B60T 7/12; B60T 8/885; B60T 8/00; B60K 31/00; B60K 31/0008; B60R 1/00; B60R 11/04; B62D 6/003; B62D 15/025; B62D 6/00; B60W 40/068; B60W 30/02; B60W 30/08; B60W 50/0098; B60W 2050/0037; B60W 2050/0079; B60W 2050/0083;
(Continued)

(56) References Cited

U.S. PATENT DOCUMENTS

| | | | |
|---|---|---|---|
| 9,409,554 B2 * | 8/2016 | Raste | B60T 8/1755 |
| 2007/0188020 A1 * | 8/2007 | Schmidt | B60T 8/1764 |
| | | | 303/149 |

(Continued)

*Primary Examiner* — Behrang Badii
(74) *Attorney, Agent, or Firm* — Norton Rose Fulbright US LLP; Gerard Messina

(57) ABSTRACT

A method for operating a driver assistance system of a motor vehicle, which includes multiple wheels in contact with a roadway, the driver assistance system including at least one unit which includes a friction coefficient model and at least one sensor, which provides an input signal for the friction coefficient model, a friction coefficient between at least one of the wheels and the roadway being ascertained with the aid of the friction coefficient model, and the driver assistance system being set or calibrated as a function of the ascertained friction coefficient. Friction coefficients are ascertained with the aid of multiple of the units that ascertained friction coefficients are compared to one another, at least one valid friction coefficient of the friction coefficients is determined with the aid of the comparison, and the driver assistance system is set or calibrated as a function of the valid friction coefficient.

15 Claims, 2 Drawing Sheets

(51) Int. Cl.
*B60W 50/00* (2006.01)
*B60W 30/02* (2012.01)
*G06K 9/00* (2006.01)
*G06F 17/11* (2006.01)
*B60T 8/172* (2006.01)
*B60T 8/171* (2006.01)

(52) U.S. Cl.
CPC .......... *B60W 50/0098* (2013.01); *B60T 8/171* (2013.01); *B60T 8/172* (2013.01); *B60W 2050/0037* (2013.01); *B60W 2050/0079* (2013.01); *B60W 2050/0083* (2013.01); *B60W 2050/0088* (2013.01); *B60W 2510/30* (2013.01); *B60W 2530/20* (2013.01); *B60W 2550/12* (2013.01); *B60W 2550/14* (2013.01); *B60W 2550/147* (2013.01); *B60W 2550/402* (2013.01); *B60W 2550/404* (2013.01); *G06F 17/11* (2013.01); *G06K 9/00* (2013.01); *G06K 9/00798* (2013.01)

(58) Field of Classification Search
CPC ..... B60W 2050/0088; B60W 2510/30; B60W 2530/20; B60W 2550/12; B60W 2550/14; B60W 2550/147; B60W 2550/402; B60W 2550/404; G06F 7/00; G06F 17/00; G06F 19/00; G05D 1/00; G05D 3/00; B60L 11/00; H04N 7/183; G05B 9/02
See application file for complete search history.

(56) References Cited

U.S. PATENT DOCUMENTS

| | | | |
|---|---|---|---|
| 2011/0015906 A1* | 1/2011 | Bian | B60T 8/172 703/2 |
| 2015/0251659 A1* | 9/2015 | Fischer | B60W 40/068 382/104 |

* cited by examiner

METHOD AND DEVICE FOR OPERATING A DRIVER ASSISTANCE SYSTEM, AND DRIVER ASSISTANCE SYSTEM

CROSS REFERENCE

The present application claims the benefit under 35 U.S.C. § 119 of German Patent Application No. DE 102016221932.4 filed on Nov. 9, 2016, which is expressly incorporated herein by reference in its entirety.

BACKGROUND INFORMATION

The present invention relates to a method for operating a driver assistance system of a motor vehicle, which includes multiple wheels in contact with a roadway, the driver assistance system including at least one unit which includes a friction coefficient model and at least one sensor, which provides an input signal for the friction coefficient model, a friction coefficient between at least one of the wheels and the roadway being ascertained with the aid of the friction coefficient model, and at least one driver assistance unit of the motor vehicle being set or calibrated as a function of the ascertained friction coefficient.

The present invention furthermore relates to a driver assistance system including a corresponding device.

BACKGROUND INFORMATION

Modern driver assistance systems, such as lane keeping systems, automatic braking systems and the like, generally have a plurality of units for ascertaining an in particular instantaneous friction coefficient between wheels of the motor vehicle and the roadway. These so-called friction coefficient estimators are very specifically designed for different driver assistance units and are independent of one another. This has advantages with respect to the availability of the signals and the optimal design of the driver assistance system, and in particular of the individual driver assistance units of the driver assistance system. The respective unit includes a friction coefficient model, which may be formed by software and/or by hardware, and a sensor, which provides an input signal for the friction coefficient model. As a function of the input signal, the friction coefficient model determines the respective friction coefficient as an output signal. The driver assistance system is set or calibrated as a function of the ascertained friction coefficient in order to be able to respond optimally in an instantaneous driving situation, for example in order to initiate a safe braking process or to maximally brake wheels of the motor vehicle individually when negotiating curves without loss of static friction.

SUMMARY

An example method according to the present invention may have the advantage that, while the independence of the friction coefficient ascertainment is preserved, the ascertained friction coefficients are correlated with one another to be able to optimally set or calibrate the driver assistance system, in particular at least one or multiple driver assistance units. This in particular yields the advantage that the error-proneness of friction coefficient estimators is reduced or taken into consideration in order to determine the most plausible friction coefficient. According to the present invention, this is achieved in that the driver assistance system includes multiple of the described units, that friction coefficients are ascertained with the aid of the multiple units, that simultaneously or almost simultaneously ascertained friction coefficients are compared to one another, that at least one valid friction coefficient of the friction coefficients is determined with the aid of the comparison, and that the driver assistance system is set or calibrated as a function of the valid friction coefficient.

According to one preferred refinement of the present invention, it is provided that the origin of the respective friction coefficient, i.e., the unit determining the friction coefficient, is taken into consideration in the comparison of the friction coefficients. In this way, for example, the algorithm of the friction coefficient model for calculating the friction coefficient or the type of the input signal or of the sensor for determining the performance capability or accuracy of the friction coefficient estimator is taken into consideration. This offers, and preferably also utilizes, the option of taking the plausibility of the respective friction coefficient into consideration in the comparison of the friction coefficients and of thus weighting individual friction coefficients more strongly than others in the comparison, for example, in order to obtain a preferably reliable friction coefficient determination. Preferably, it is provided that initially a valid friction coefficient range is determined from the friction coefficients. This range is in particular limited by an ascertained maximum friction coefficient and an ascertained minimum friction coefficient, the maximum friction coefficient and the minimum friction coefficient preferably being varied as a function of the further ascertained friction coefficients and/or present ambient conditions, as is described in greater detail below.

Furthermore, it is preferably provided that an error-proneness of the ascertained friction coefficient is determined as a function of which of the units ascertains the respective friction coefficient, and is taken into consideration in the comparison. The different friction coefficient estimators or units have differing error-pronenesses, for example due to the input signal. By taking these into consideration, an optimal determination of one or multiple valid friction coefficients or of the valid friction coefficient range is ensured.

Furthermore, it is preferably provided that least one ambient condition is detected, and that the error-proneness is determined as a function of the detected ambient condition. In this way, it is taken into consideration that, for example, the input signal which is supplied by a sensor may change with changing ambient conditions at the same actual friction coefficients. For example, a change in temperature or a change in humidity may affect the input signal and thereby impair the error-proneness or plausibility of an ascertained friction coefficient.

Ambient conditions which are monitored are preferably an outside temperature, a humidity, a roadway condition and/or a tire age of at least one of the wheels. These ambient conditions affect both the measured value of a sensor and the actual friction coefficient, and thus help ascertain the respective friction coefficient.

Furthermore, it is preferably provided that at least one friction coefficient is determined as a function of an instantaneous outside temperature, a windshield wiper activity, a window opening, an inside temperature, a ventilation system activity or air conditioning system activity. This friction coefficient determination thus takes place independently of the actual driving characteristic of the motor vehicle and is rather based on so-called soft factors, which provide an indication of the ambient conditions of the motor vehicle, from which it is possible to ascertain whether the friction coefficient, for example, is in a first range having high friction coefficients or a second range having low friction coefficients. As a result of this type of friction coefficient ascertainment, a friction coefficient is thus roughly estimated or pre-estimated. In this way, other friction coefficients which are based on the data of the sensors are subjected to a plausibility check.

According to one preferred refinement of the present invention, it is provided that at least one of the friction coefficients is determined as a function of data of a navigation system. The prerequisite for this is that pieces of information about the roadway condition are also stored in the navigation system. By taking the stored roadway condition into consideration, a presently acting maximum friction coefficient may be determined, in particular with knowledge of a tire used on the particular wheel. In particular, a friction coefficient change may be predicted or promptly ascertained or subjected to a plausibility check using the data of the navigation system.

Furthermore, it is preferably provided that at least one of the friction coefficients is ascertained as a function of an instantaneous driving characteristic of the motor vehicle. To ascertain the driving characteristic, for example, a longitudinal acceleration, a transverse acceleration, a rotation rate and/or a yaw rate of the motor vehicle and an instantaneous driving speed of the motor vehicle are monitored. Preferably, an instantaneous steering angle, the activity of a braking system and/or a required driving torque are also monitored. The driving characteristic of the motor vehicle in an instantaneous driving situation may be ascertained from all these values. With knowledge of the aforementioned values, it is possible, in particular, to determine an anticipated driving characteristic, which is compared to an actually present driving characteristic. If, for example, the detected longitudinal acceleration deviates from an anticipated longitudinal acceleration which results from an active state of the braking system, it is thereupon recognized that a higher or lower friction coefficient than actually anticipated is present. Accordingly, this friction coefficient may be adapted and determined.

Furthermore, it is preferably provided that least one of the friction coefficient models is calibrated or corrected as a function of the valid friction coefficient. In this way, an intervention in the respective unit takes place as a function of the ascertained valid friction coefficient. As a result, a so-called online calibration may be carried out during the driving operation of the motor vehicle, which ensures that the respective friction coefficient model always operates optimally.

According to one preferred refinement of the present invention, it is provided that at least one of the ascertained friction coefficients is determined as a function of a chronological progression, and that an interference factor influencing the validity of the respective friction coefficient is determined as a function of at least one of the detected ambient conditions. It is thus ascertained which one is the interference factor decisively influencing the respective friction coefficient. With knowledge of this interference factor, a friction coefficient calibration or the correction/setting of a driver assistance system or a driver assistance unit may then optimally take place, for example in that the interference factor is monitored and a prompt adjustment of the friction coefficient ascertainment takes place.

Furthermore, it is preferably provided that the respectively ascertained friction coefficient and/or the valid friction coefficient is/are transmitted to a central database. A central database is understood to mean an in particular stationary unit which is present separately from the vehicle and communicates with it, for example via a mobile communication network, in order to receive the ascertained friction coefficients of the vehicle, in particular the ascertained friction coefficients of a plurality of vehicles. The central database forms a component of the driver assistance system which is situated outside the respective motor vehicle. In this respect, it is possible to speak of a local driver assistance system, which refers solely to the motor vehicle, and a global driver assistance system, which includes the central database and the driver assistance units of a plurality of vehicles. The central database evaluates the received friction coefficients to determine a valid friction coefficient. The database, in particular, takes into consideration from which vehicle it received the respective friction coefficients and in which location the vehicle was situated during the ascertainment of the respective friction coefficient. In this way, preferably a friction coefficient map is generated, which forms geographical regions having different available friction coefficients, for example. Advantageously, the central database transmits a valid friction coefficient or friction coefficient range, which results from the preceding ascertainment and the comparison of the received friction coefficients, back to the motor vehicle or motor vehicles, which then calibrate or set their driver assistance units as a function of the received data. For the exchange of the data, in particular a so-called cloud service is utilized, to which a plurality of motor vehicles and, if necessary, also multiple central/stationary databases have access to obtain a preferably complete friction coefficient map.

According to one preferred refinement of the present invention, it is provided that, additionally or alternatively, at least one friction coefficient is provided by a or the aforementioned central database, which communicates with multiple motor vehicles. As was already mentioned above, the valid friction coefficient may be ascertained from received friction coefficients by the database and may then be made available. Alternatively, it may also be provided that the database creates a friction coefficient map, for example based on roadway data and provides a corresponding valid friction coefficient, which is in particular dependent on the roadway condition, to the respective motor vehicle as a function of its position. The database may also take weather data into consideration, for example, and thereby vary or optimize the provided valid friction coefficient.

In accordance with the present invention, an example device includes a control unit specifically configured to carry out the method according to the present invention when used as intended. This results in the aforementioned advantages.

In accordance with the present invention, an example driver assistance system includes a device according to the present invention. This also results in the aforementioned advantages. The driver assistance system for the motor vehicle preferably includes at least one, preferably multiple driver assistance units, which are set or calibrated as a function of one or multiple determined valid friction coefficients, as described above. The driver assistance system in the design as a global driver assistance system furthermore preferably includes at least one central database, which receives the friction coefficients of multiple motor vehicles and, from these, determines one or multiple valid friction coefficients and provides it or them to the motor vehicles. In particular, the database is designed to generate a friction coefficient map, which in particular is provided completely or in parts to the motor vehicles to enable a prompt calibration/setting of the respective driver assistance unit or of the driver assistance system.

The present invention is to be described in greater detail hereafter based on the figures.

DETAILED DESCRIPTION OF EXAMPLE EMBODIMENTS

Figure 1:
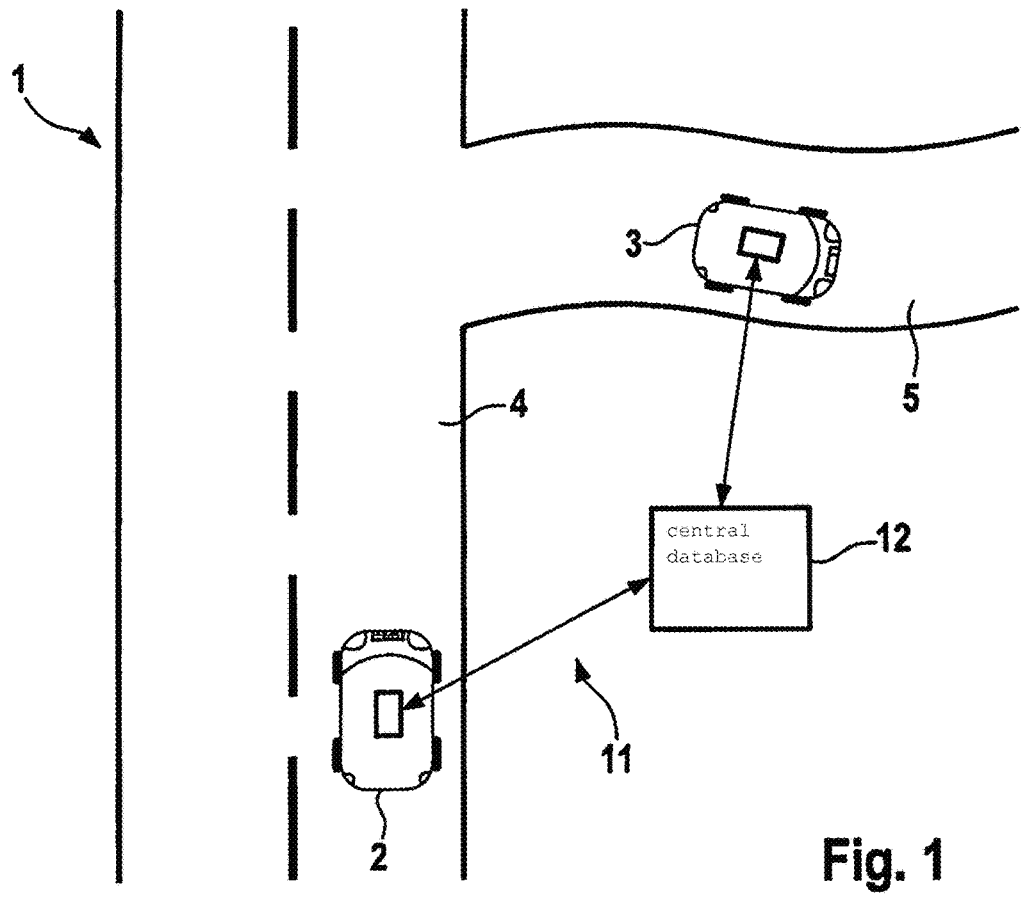
FIG. 1 shows a driver assistance system for motor vehicles in a simplified illustration.

FIG. 1, in a simplified representation, shows a driver assistance system 1 for motor vehicles. For this purpose, FIG. 1 shows multiple motor vehicles 2 and 3, which are situated on different roadways 4 and 5. Roadways 4 and 5 differ in their roadway condition, presently roadway 4 being a paved road and roadway 5 being a gravel road.

Figure 2:
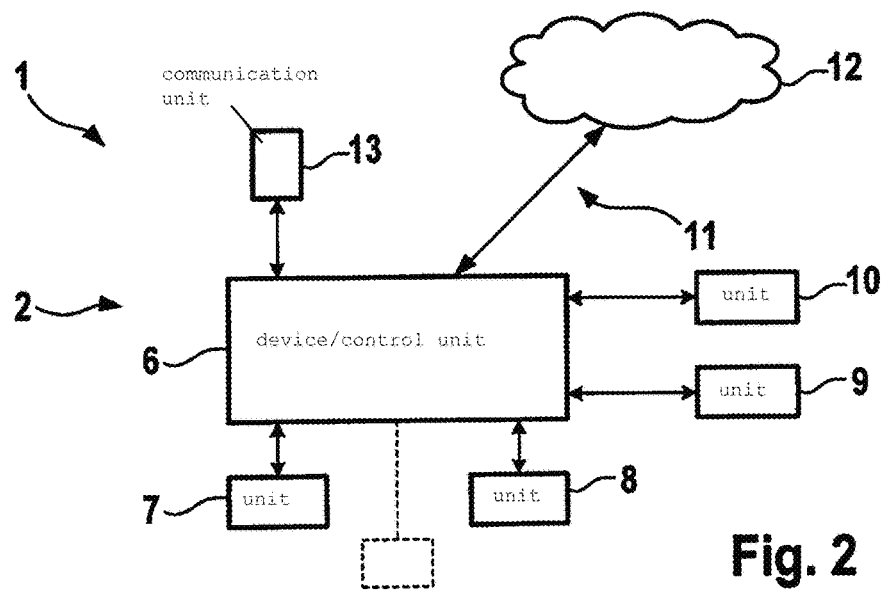
FIG. 2 shows the driver assistance system in a simplified detailed illustration.

FIG. 2 shows a schematic illustration of one of motor vehicles 2. Preferably, however, what is described hereafter for all motor vehicles which operate with driver assistance system 1 or are part of driver assistance system 1 applies to motor vehicle 2. Motor vehicle 2 includes a device 6, in particular in the form of a control unit, which is connected to multiple units 7, 8, 9 and 10. Units 7 through 10 have in common that they each include a sensor and a friction coefficient model, which receive an output signal of the respective sensor as an input signal. With the aid of the friction coefficient model, the respective unit 7, 8, 9, 10 determines an instantaneous friction coefficient between at least one of the wheels of motor vehicle 2 and roadway 4 or 5.

For example, unit 7 is designed as an EPS system, which detects pieces of information of toothed rack forces of an electrical/electronic power steering system and thereby derives a friction coefficient.

Unit 8 is presently an ABS braking system or control unit, for example, which determines a friction coefficient from pieces of slip information of one or multiple wheels.

Unit 9 is presently designed as a traction control system (TCS), which determines a friction coefficient, also as a function of slip values at the wheels.

Unit 10 is presently designed as an electronic stability program/unit (ESP), which carries out wheel-individual braking processes by stabilizing the driving characteristic of motor vehicle 2. Unit 10 detects a present friction coefficient, for example as a function of wheel speeds.

Device 6 may also be connected to further devices, as shown by the dotted line, which include a friction coefficient model in one way or another in order to determine an instantaneous friction coefficient.

Presently, units 7, 8, 9 and 10 are driver assistance units at the same time, which assist the driver in driving motor vehicle 2, and in particular ensure driving safety. For this purpose, units 7, 8, 9, 10 initiate measures as needed, such as wheel-specific braking processes, to adapt the driving stability of motor vehicle 2. The driver assistance systems operate optimally when the instantaneous friction coefficient between the wheels of the motor vehicle and roadway 4 or 5 is known. For this purpose, the friction coefficient models are utilized, so that the respective driver assistance system may be optimally set or calibrated using the respective instantaneously determined friction coefficient.

The method described hereafter is now carried out by device 6, which is in particular designed as a control unit or includes such a unit.

Device 6 receives the friction coefficients ascertained with the aid of the respective friction coefficient models by retrieving these or in that these are provided or transmitted automatically to the control unit. Device 6 correlates the individual friction coefficients with one another by comparing these to one another, the origin of the respective friction coefficient and its error-proneness, in particular as a function of present ambient conditions, being taken into consideration in the comparison.

The method may be supplied with friction coefficients of different classes. For example, it is possible to consider friction coefficients which depend on soft factors, such as the outside temperature, a windshield wiper activity, a window opening, an inside temperature, an air conditioning system activity, a ventilation system activity or a seat heater activity. From this, a friction coefficient, in particular a friction coefficient index $\mu_B$ may be ascertained. In particular, a friction coefficient range, which is likely for the present ambient conditions, may be determined as a function of the described soft factors.

Another class of friction coefficients may be derived from the driving characteristic of motor vehicle 2 and indicates at least one friction coefficient which is instantaneously used, and is thus available at least on present roadway 4 or 5. This instantaneous friction coefficient $\mu_{MIN}$ may be calculated, for example, from the acceleration of the motor vehicle using the following formula:

$$\mu_{MIN} = \frac{\sqrt{a_x^2 + a_y^2}}{9.81 \frac{m}{s^2}}$$

$a_x$ being the acceleration of motor vehicle 2 in the longitudinal direction, and $a_y$ being the acceleration of the motor vehicle in the transverse direction. The relationship from the formula applies in approximation for all motor vehicles whose normal force is not increased by their dynamic measures, such as spoilers.

When a friction coefficient is ascertained by a driver assistance system during an active intervention, such as by the ESP system, a maximum available friction coefficient $\mu_{MAX}$ is ascertained/determined.

With the aid of a skillful interpretation of these values, a differing quality of aggregate friction coefficients may be created, as is to be described in greater detail based on FIG. 3. The goal is to determine the friction coefficient in a curve preferably precisely with the aid of the method.

Figure 3A:
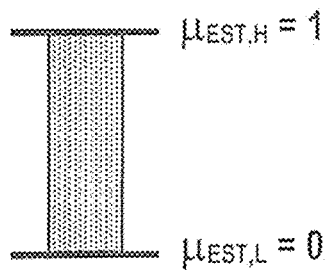
FIGS. 3A through 3D show an exemplary friction coefficient determination of the driver assistance system.

At point in time $t_0$, no data whatsoever for the present road segment or present road section are available yet. The possible friction coefficient $\mu_{EST}$ is thus in the full range from 0 to 1 $\mu$, as shown in FIG. 3A.

Figure 3B:
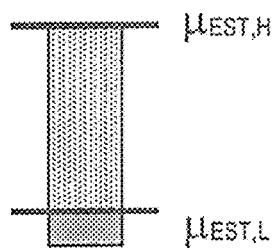
Figure 3C:
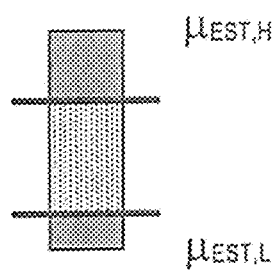

When the vehicle accelerates, for example at 2 m/s², without a control intervention from the traction control unit (unit 8) taking place, a minimum friction coefficient $\mu_{MIN}$ of 0.2 is thus ascertained, and the lowest possible friction coefficient $\mu_{EST, L}$ is set to 0.2, as shown in FIG. 3B. The possible friction coefficient $\mu_{EST}$ has thus been limited to a range of 0.8.

If it is detected due to an active windshield wiper and/or rain sensor that presently there is precipitation, the friction coefficient hypothesis is limited further. Since the friction coefficient decreases with increasing precipitation, the maximum possible friction coefficient $\mu_{EST, H}$ is thus set, for example, to 0.7, for example during heavy precipitation, which is quantitatively detectable by the rain sensor, as shown in FIG. 3B.

If cold, i.e., a low outside temperature, in particular below the freezing point, is now also added to the precipitation, and the motor vehicle is moved across a bridge, for example, on which black ice occurs or may occur, the precision of the available friction coefficient $\mu_{EST}$ may be further improved. The driving on the bridge is recognized, for example, based on data of a navigation system of motor vehicle 2. The outside temperature is preferably continuously monitored as the ambient temperature.

Figure 3D:
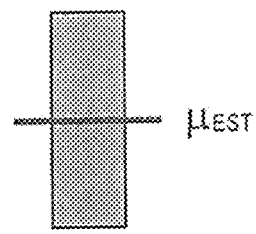

During an active intervention of the ESP system (unit 8), multiple friction coefficient models of driver assistance system 1 estimate the instantaneous friction coefficient on at least one of the wheels of motor vehicle 2. In a safe interpretation of the friction coefficient aggregation, the smallest of all estimated friction coefficients is determined as the valid friction coefficient to offer the highest possible safety. Since this information contains exact friction coefficient information, the range limits for the possible friction coefficients $\mu_{EST, L}$ and $\mu_{EST, H}$ are dispensed with and may be replaced with valid friction coefficient $\mu_{EST}$, which corresponds to the minimum estimated friction coefficient of all friction coefficient models, as shown in FIG. 3D.

If this method is not carried out for each motor vehicle 2, 3, but always based on the present position at which the friction coefficients are ascertained or determined, a globally available friction coefficient map may thus be created, which at every point provides a valid friction coefficient with a certain confidence.

Advantageously, as mentioned above, the error-proneness of the friction coefficient models is also taken into consideration in the comparison of the friction coefficients for the determination of a valid friction coefficient. For this purpose, for example, an outside temperature or the age of a tire of one of the wheels of the motor vehicle is ascertained to subject the estimation accuracy of the respective friction coefficient model to a plausibility check. With the knowledge as to which friction coefficient models are prone to which errors, and monitoring the relevant ambient conditions, it is identified when individual friction coefficient models run the risk of supplying implausible values. If it is recognized, for example, that one of the friction coefficient models does not supply a reliable friction coefficient due to a relevant ambient condition, such as a particularly low temperature, this friction coefficient is rejected for further use, or the affected friction coefficient model is reset or recalibrated, in particular as a function of a friction coefficient declared to be valid.

By monitoring the progression or the history of individual friction coefficients with respect to one another, it is moreover possible to quantify or recognize disturbance variables and have central device 6 communicate this to central units 7, 8, 9, 10.

As shown in FIG. 2, device 6 or the respective motor vehicle 2 may furthermore communicate via a communication system 11 with a central database 12 (processing center), as provided as a stationary unit in FIG. 1 and as a cloud service in FIG. 2. It is in particular provided that each motor vehicle 2, 3 transmits the friction coefficients it has ascertained, in particular the friction coefficients determined to be valid, to central database 12, which, in turn, provides these to other motor vehicles. If, for example, the preceding motor vehicle 3 ascertains a lower friction coefficient on roadway 5, it communicates this to database 12 after determination of a valid friction coefficient. This friction coefficient is, in turn, provided to motor vehicle 2, which, as soon as it turns onto roadway 5, has this friction coefficient available without initially having to ascertain it itself. The prerequisite for this is, of course, that both motor vehicles 2, 3 are able to determine their positions with the aid of an in particular satellite-based navigation system. In addition or as an alternative, device 6 is furthermore connected to a communication unit 13, which, for example, carries out the communication with database 12 or in particular is designed as a vehicle-to-vehicle communication unit, in order to exchange or be able to exchange friction coefficient data directly with the motor vehicles in the indirect or direct vicinity of motor vehicle 2.

According to one further exemplary embodiment, it is provided that central database 12 itself carries out the determination of valid friction coefficients as a function of the friction coefficients ascertained by the friction coefficient estimators of the respective motor vehicle 2, 3 or by units 7, 8, 9, 10, so that the computing complexity is at least partially shifted from the respective motor vehicle 2, 3 into external database 12.

What is claimed is:

1. A method for operating a driver assistance system of a motor vehicle, which includes multiple wheels in contact with a roadway, the driver assistance system including at least one unit which includes a friction coefficient model and at least one sensor, which provides an input signal for the friction coefficient model, the method comprising:
   ascertaining a friction coefficient between at least one of the wheels and the roadway with the aid of the friction coefficient model;
   setting or calibrating the driver assistance system as a function of the ascertained friction coefficient;
   wherein a plurality of friction coefficients are ascertained with the aid of multiple of the units, simultaneously or almost simultaneously ascertained friction coefficients are compared to one another, at least one valid friction coefficient of the plurality of friction coefficients being determined with the aid of the comparison, and the driver assistance system is set or calibrated as a function of the valid friction coefficient.

2. The method as recited in claim 1, wherein an origin of the respective friction coefficient is taken into consideration in the comparison of the friction coefficients.

3. The method as recited in claim 1, wherein an error-proneness of the friction coefficient is determined as a function of which of the units ascertains the respective friction coefficient, and is taken into consideration in the comparison.

4. The method as recited in claim 3, wherein at least one ambient condition is detected, and the error-proneness is determined as a function of the detected ambient condition.

5. The method as recited in claim 4, wherein at least one of an outside temperature, a humidity, a roadway condition, and a tire age of at least one of the wheels, are monitored as the ambient condition.

6. The method as recited in claim 1, wherein at least one friction coefficient is determined as a function of at least one of a present outside temperature, a windshield wiper activity, a window opening, an inside temperature, a ventilation system activity, and an air conditioning system activity.

7. The method as recited in claim 1, wherein at least one of the friction coefficients is determined as a function of data of a navigation system.

8. The method as recited in claim 1, wherein at least one of the friction coefficients is determined as a function of a present driving characteristic of the motor vehicle.

9. The method as recited in claim 1, wherein at least one of the friction coefficient models is calibrated/corrected as a function of the valid friction coefficient.

10. The method as recited in claim 1, wherein at least one of the ascertained friction coefficients is determined as a function of a chronological progression, and an interference factor influencing the validity of the respective friction coefficient is determined as a function of at least one of the detected ambient conditions.

11. The method as recited in claim 1, wherein at least one of the friction coefficient models is calibrated or set with the aid of the determined interference factor.

12. The method as recited in claim 1, wherein the respectively ascertained friction coefficient and/or the valid friction coefficient are transmitted to a central database.

13. The method as recited in claim 1, wherein at least one friction coefficient is provided by a central database, which communicates with multiple motor vehicles.

14. A device for operating a driver assistance system of a motor vehicle, which includes multiple wheels in contact with a roadway, the driver assistance system including multiple units which each includes a friction coefficient model and at least one sensor, and which provides an input signal for the friction coefficient model, the device comprising:
a control unit connected to the units, the control unit being specifically configured to ascertain a friction coefficient between at least one of the wheels and the roadway with the aid of the friction coefficient model, the control unit configured to set or calibrate the driver assistance system as a function of the ascertained friction coefficient, wherein a plurality of friction coefficients ascertained with the aid of multiple of the units, simultaneously or almost simultaneously ascertained friction coefficients are compared to one another, at least one valid friction coefficient of the plurality of friction coefficients being determined with the aid of the comparison, and the driver assistance system is set or calibrated as a function of the valid friction coefficient.

15. A driver assistance system for a motor vehicle, which includes multiple wheels in contact with a roadway, the driver assistance system comprising:
multiple units which each include a friction coefficient model and at least one sensor, which provides an input signal for the respective friction coefficient model; and
a control unit connected to the units, the control unit being specifically configured to ascertain a friction coefficient between at least one of the wheels and the roadway with the aid of the friction coefficient model, the control unit configured to set or calibrate the driver assistance system as a function of the ascertained friction coefficient, wherein a plurality of friction coefficients ascertained with the aid of multiple of the units, simultaneously or almost simultaneously ascertained friction coefficients are compared to one another, at least one valid friction coefficient of the plurality of friction coefficients being determined with the aid of the comparison, and the driver assistance system is set or calibrated as a function of the valid friction coefficient.

* * * * *